(12) United States Patent
Nair et al.

(10) Patent No.: US 8,712,710 B2
(45) Date of Patent: Apr. 29, 2014

(54) METHOD AND APPARATUS FOR DETECTION OF LVDT CORE FALLOUT CONDITION

(75) Inventors: Rakesh Damodaran Nair, Bangalore (IN); Arulvel Sellamuthu, Tamil (IN); Nagaraja Sundaresh, Bangalore (IN); Manjunatha Kotreshi Alabur, Bangalore (IN); Amol Kinage, Bangalore (IN); Karthik Giritharan, Bangalore (IN); Ananda Huchappa Shastry, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 518 days.

(21) Appl. No.: 13/107,042

(22) Filed: May 13, 2011

(65) Prior Publication Data

US 2012/0290238 A1  Nov. 15, 2012

(51) Int. Cl.
*G01R 5/06* (2006.01)
*G01D 5/22* (2006.01)

(52) U.S. Cl.
CPC ..................... *G01D 5/2291* (2013.01)
USPC .................... 702/65; 702/57; 702/60; 702/64; 324/207.18; 73/865.9

(58) Field of Classification Search
CPC ....... G01D 5/2291; G01D 5/22; G01D 5/125; G01D 5/2216; G01R 15/183; H02P 13/08
USPC ................. 73/865.9; 324/207.18; 702/57, 60, 702/64–65
See application file for complete search history.

(56) References Cited

U.S. PATENT DOCUMENTS

| | | | |
|---|---|---|---|
| 4,140,998 A | 2/1979 | Bettle | |
| 4,514,689 A | 4/1985 | Gerard | |
| 4,591,795 A | 5/1986 | McCorkle | |
| 4,667,158 A | 5/1987 | Redlich | |
| 4,847,548 A | 7/1989 | Lafler | |
| 4,857,919 A | 8/1989 | Braswell | |
| 5,180,979 A * | 1/1993 | Frazzini et al. | 324/207.18 |
| 5,399,964 A | 3/1995 | Zoller | |

(Continued)

FOREIGN PATENT DOCUMENTS

| | | |
|---|---|---|
| EP | 0670990 A1 | 9/1995 |
| EP | 0768515 A1 | 4/1997 |

(Continued)

OTHER PUBLICATIONS

"LVDT Signal Conditioner, AD598", Analog Devices, Oct. 1989, 16 pages.

(Continued)

*Primary Examiner* — Mischita Henson

(57) ABSTRACT

A method includes measuring a first voltage ($V_A$) across a first sensing coil of a linear variable differential transformer (LVDT) and measuring a second voltage ($V_B$) across a second sensing coil of the LVDT. The method also includes signaling a core fallout condition in response to (i) determining that a ratio of $V_A$ and $V_B$ is within a specified range of a value of one and (ii) determining that a sum of $V_A$ and $V_B$ is less than a sum of $V_{A0}$ and $V_{B0}$ by more than a specified amount. $V_{A0}$ and $V_{B0}$ are minimum voltages across the first and second sensing coils of the LVDT, respectively, when a core of the LVDT is in the LVDT.

20 Claims, 3 Drawing Sheets

(56) References Cited

U.S. PATENT DOCUMENTS

| | | |
|---|---|---|
| 5,767,670 A | 6/1998 | Maher et al. |
| 7,053,603 B2 | 5/2006 | Swart |
| 7,138,794 B1 | 11/2006 | Cook et al. |
| 2004/0075428 A1 | 4/2004 | Proksch et al. |
| 2007/0179738 A1 | 8/2007 | Stolan |
| 2008/0294311 A1 | 11/2008 | Henson |
| 2009/0166088 A1* | 7/2009 | Jeffryes et al. ............... 175/41 |

FOREIGN PATENT DOCUMENTS

| | | |
|---|---|---|
| EP | 1340040 A2 | 9/2003 |
| EP | 1512095 A2 | 3/2005 |
| JP | 7086837 A | 3/1995 |

OTHER PUBLICATIONS

"World's Most Advanced AC-LVDT Signal Conditioner", Everight Sensors Corporation, 2010, 2 pages.

Damiano Crescini, et al., "Application of an FFT-Based Algorithm to Signal Processing of LVDT Position Sensors", IEEE Transactions on Instrumentation and Measurement, vol. 47, No. 5, Oct. 1998, p. 1119-1123.

"Signal Conditioning an LVDT Using a TMS320F2812 DSP", Texas Instruments, Aug. 2003, 27 pages.

Notification of Transmittal of the International Search Report and the Written Opinion of the International Searching Authority, or the Declaration dated Nov. 14, 2012 in connection with International Patent Application No. PCT/US2012/035741.

\* cited by examiner

US 8,712,710 B2

METHOD AND APPARATUS FOR DETECTION OF LVDT CORE FALLOUT CONDITION

TECHNICAL FIELD

This disclosure relates generally to control systems. More specifically, this disclosure relates to an apparatus and method for detection of a linear variable differential transformer (LVDT) core fallout condition.

BACKGROUND

Processing facilities are typically managed using process control systems. Among other functions, these control systems often manage the use of valves, which control the flow of materials in the processing facilities. Example processing facilities include manufacturing plants, chemical plants, crude oil refineries, and ore processing plants. In these facilities, the valves may control the flow of water, oil, hydrochloric acid, or any other or additional materials in the facilities.

Linear variable differential transformers (LVDTs) are electro-mechanical transducers widely used to measure position or displacement. An LVDT may be used in a process control system to provide feedback relating to a physical position of a valve or other control device. In this example, a position of a magnetic core in the LVDT is sensed by the process control system. In some failure modes, a core may physically fall out of an LVDT. If this failure mode is not detected, the process control system may provide incorrect control signals to the associated control device. This may result in damage to the processing facility or dangerous conditions for personnel in the processing facility.

SUMMARY

This disclosure provides a method and apparatus for detection of a linear variable differential transformer (LVDT) core fallout condition.

In a first embodiment, a method includes measuring a first voltage ($V_A$) across a first sensing coil of a linear variable differential transformer (LVDT) and measuring a second voltage ($V_B$) across a second sensing coil of the LVDT. The method also includes signaling a core fallout condition in response to:

(i) determining that a ratio of $V_A$ and $V_B$ is within a specified range of a value of one; and (ii) determining that a sum of $V_A$ and $V_B$ is less than a sum of $V_{A0}$ and $V_{B0}$ by more than a specified amount, where $V_{A0}$ and $V_{B0}$ are minimum voltages across the first and second sensing coils of the LVDT, respectively, when a core of the LVDT is in the LVDT.

In a second embodiment, an apparatus includes a circuit configured to measure a first voltage ($V_A$) across a first sensing coil of an LVDT and measure a second voltage ($V_B$) across a second sensing coil of the LVDT. The apparatus also includes a processing device configured to signal a core fallout condition in response to:

(i) determining that a ratio of $V_A$ and $V_B$ is within a specified range of a value of one; and (ii) determining that a sum of $V_A$ and $V_B$ is less than a sum of $V_{A0}$ and $V_{B0}$ by more than a specified amount, where $V_{A0}$ and $V_{B0}$ are minimum voltages across the first and second sensing coils of the LVDT, respectively, when a core of the LVDT is in the LVDT.

In a third embodiment, a non-transitory computer readable medium embodies a computer program. The computer program includes computer readable program code for receiving a measurement of a first voltage ($V_A$) across a first sensing coil of an LVDT and for receiving a measurement of a second voltage ($V_B$) across a second sensing coil of the LVDT. The computer program also includes computer readable program code for signaling a core fallout condition in response to:

(i) determining that a ratio of $V_A$ and $V_B$ is within a specified range of a value of one; and (ii) determining that a sum of $V_A$ and $V_B$ is less than a sum of $V_{A0}$ and $V_{B0}$ by more than a specified amount, where $V_{A0}$ and $V_{B0}$ are minimum voltages across the first and second sensing coils of the LVDT, respectively, when a core of the LVDT is in the LVDT.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
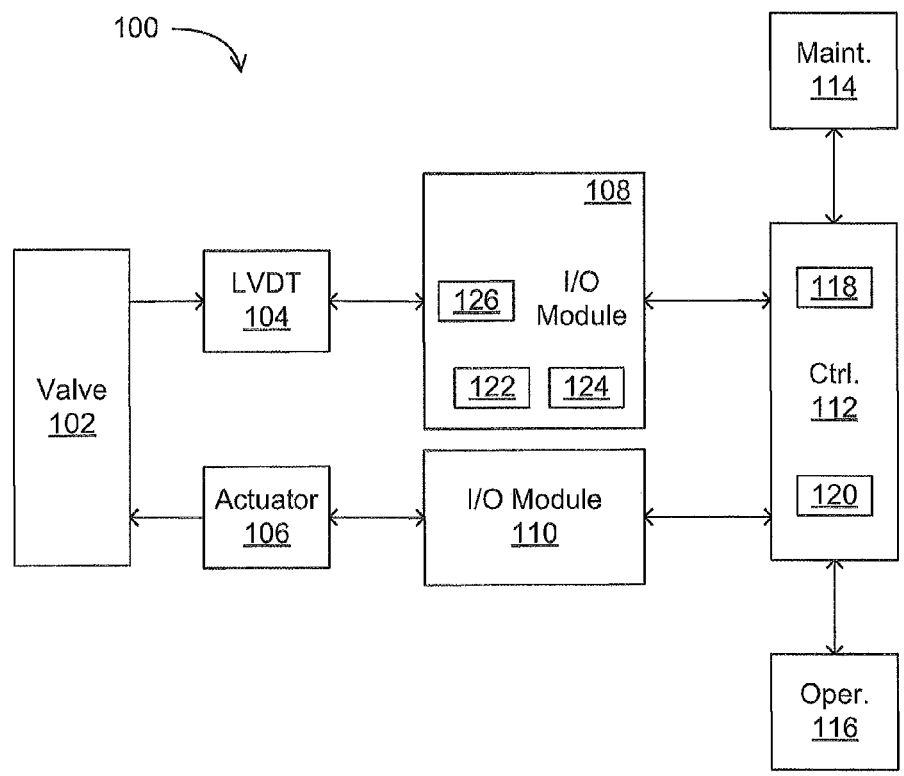
FIG. 1 illustrates an example process control system according to this disclosure.

FIG. 1 illustrates an example process control system 100 according to this disclosure. The process control system 100 shown in FIG. 1 is for illustration only. Other systems may be used without departing from the scope of this disclosure.

As shown in FIG. 1, the process control system 100 includes a valve 102 (or other control element) whose position is sensed by a linear variable differential transformer (LVDT) 104. A position of the valve 102 is controlled by an actuator 106. The valve 102 controls a rate at which a fluid or gas flows in a pipe or other structure. This may affect a speed, temperature, or other characteristic(s) of one or more elements of a processing facility in which the process control system 100 operates. The valve 102 includes any suitable structure for physically controlling a flow of material. The LVDT 104 includes any suitable structure for measuring a position of a valve or other structure using a magnetic core. The actuator 106 includes any suitable structure for opening and closing a valve.

A first input/output (I/O) module 108 is coupled to the LVDT 104 and is configured to receive signals produced by the LVDT 104 based on a position of a core in the LVDT 104. A second I/O module 110 is coupled to the actuator 106 and is configured to send signals to the actuator 106 to cause the actuator 106 to change the position of the valve 102.

The I/O module 108 includes a circuit 126 configured to receive and process voltage signals from the LVDT 104. For example, the circuit 126 may filter or scale voltages received from the LVDT 104. The circuit 126 can also convert voltages received from the LVDT 104 from analog to digital format. The circuit 126 may further provide over-voltage protection for the I/O module 108. In particular embodiments, the circuit 126 measures root-mean-square (RMS) values for the voltages received from the LVDT 104.

In this example, the I/O module 108 also detects a core fallout condition from the voltage signals received and processed by the circuit 126. This functionality could be provided in any suitable manner. In FIG. 1, the I/O module 108 includes at least one processing device 122 configured to detect the core fallout condition. Also, at least one memory 124 stores data and instructions (such as one or more software routines) executed by the at least one processing device 122. The processing device 122 could represent any suitable processing device, such as a microprocessor, microcontroller, digital signal processor, FPGA, or ASIC. The memory 124 could represent any suitable storage and retrieval device(s), such as a RAM or ROM. However, the I/O module 108 includes any suitable structure for sensing signals from an LVDT and is not limited The I/O module 108 is coupled to a controller 112, which is operable to send and receive messages to and from the I/O module 108 relating to the signals received from the LVDT 104. The messages sent by the controller 112 to the I/O module 108 may include configuration, instructions, and program code. The messages received by the controller 112 from the I/O module 108 may include position data, alarms, and error messages. The controller 112 is also coupled to the I/O module 110 and operable to send and receive messages to the I/O module 110 relating to operating the actuator 106, which allows the controller 112 to control the valve 102 to achieve a desired setting.

The controller 112 includes any suitable structure for controlling at least one element in a processing system. As a particular example, the controller 112 could include at least one processing device 118 and at least one memory 120 that stores data and instructions (such as one or more software routines) executed by the at least one processing device 118.

In one aspect of operation, the controller 112 can command the I/O modules 108 and 110 to perform initialization procedures and tests on the valve 102, the LVDT 104, and the actuator 106, individually and collectively. For example, the I/O module 108 can test the circuitry of the LVDT 104, and the I/O module 110 can test the circuitry of the actuator 106. Furthermore, the I/O modules 108 and 110, together, can drive the valve 102 to its fully open and fully closed positions, and the I/O module 108 records the signals received from the LVDT 104 in at least those two positions.

During one or more of these tests or at other times, the I/O module 108 may determine that, through mechanical failure or unexpected valve activity, the core of the LVDT 104 is no longer present in the LVDT 104 (called a "core fallout" condition). In response, the I/O module 108 can send a message to the controller 112 or take other appropriate corrective action. In response to such a message, the controller 112 may send a related message to a maintenance system 114 to schedule troubleshooting and repair of the valve 102 and the LVDT 104. The controller 112 may also send a notification to an operator workstation 116, such as by creating an alarm visible on the workstation 116. The controller 112 may further change its processing control or begin a shutdown of some or all of the processing facility.

In this way, one previously undetected failure mode of the LVDT 104 can be detected by the process control system 100, and appropriate action can be taken. This can help to reduce damage to a processing facility or prevent the formation of dangerous conditions in the processing facility.

Although FIG. 1 illustrates one example of a process control system 100, various changes may be made to FIG. 1. For example, the process control system 100 could include any number of valves, LVDTs, actuators, I/O modules, and controllers. Also, the functional division shown in FIG. 1 is for illustration only. Various components in FIG. 1 could be combined, subdivided, or omitted and additional components could be added according to particular needs. For instance, the LVDT core monitoring operations of the I/O module 108 could be implemented in the controller 112. In this case, the circuit 126 in the I/O module 108 could provide voltage measurements to the controller 112, and the controller 112 could implement the LVDT core fallout detection functionality. In addition, the components in the system 100 may communicate via wired or wireless links and via direct or networked connections.

Figure 2:
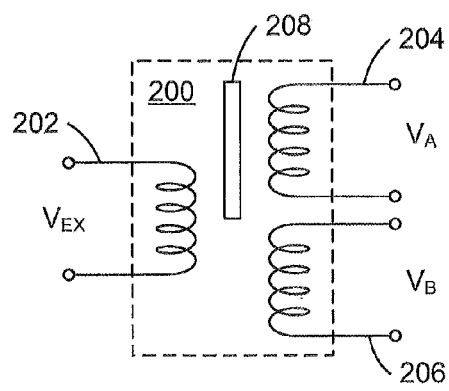
FIG. 2 illustrates a first example linear variable differential transformer (LVDT) suitable for use with a process control system according to this disclosure.

FIG. 2 illustrates a first example LVDT 200 suitable for use with a process control system according to this disclosure. The LVDT 200 here includes a transformer having an excitation (or primary) coil 202, two sensing (or secondary) coils 204 and 206, and a moveable magnetic core 208. The sensing coil 204 is physically located at one end of travel of the core 208, and the sensing coil 206 is physically located at the opposite end of travel of the core 208. As explained below with reference to FIG. 4, an alternating current (AC) input voltage ($V_{EX}$) applied to the excitation coil 202 produces output voltages in the sensing coils 204 and 206 ($V_A$ and $V_B$, respectively). The output voltages $V_A$ and $V_B$ vary depending on the position of the core 208. The LVDT 200 may be referred to as a "six wire" configuration because three separate pairs of wires connect to the LVDT 200.

Figure 3:
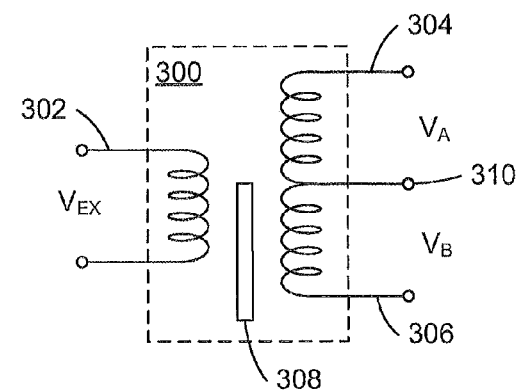
FIG. 3 illustrates a second example LVDT suitable for use with a process control system according to this disclosure.

FIG. 3 illustrates a second example LVDT 300 suitable for use with a process control system according to this disclosure. In this example, the LVDT 300 has an excitation coil 302, two sensing coils 304 and 306, and a moveable core 308. One end of each sensing coil 304 and 306 has been electrically coupled to a common contact 310. The configuration of the LVDT 300 may be referred to as a "five wire" configuration because there are five electrical contacts for the LVDT 300.

The LVDTs 200 and 300 of FIGS. 2 and 3 illustrate the cores 208 and 308 at opposite ends of travel. The core 208 magnetically couples the excitation coil 202 more strongly to the sensing coil 204 than to the sensing coil 206, resulting in a higher voltage being induced in the sensing coil 204 than in the sensing coil 206. Similarly, the core 308 magnetically couples the excitation coil 302 more strongly to the sensing coil 306 than to the sensing coil 304, resulting in a higher voltage being induced in the sensing coil 306 than in the sensing coil 304. As a result, output voltages may be sensed and compared to determine a relative position of the coil 208 or 308 between its two end of-travel positions.

Figure 4:
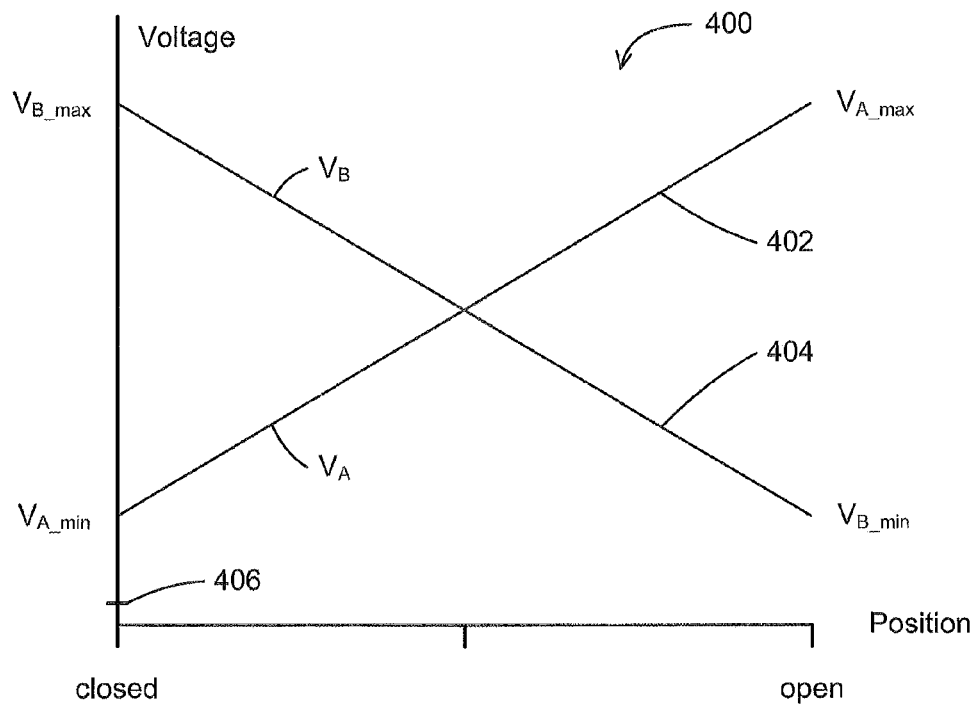
FIG. 4 illustrates an example graph presenting measured voltages in an LVDT for a plurality of conditions.

FIG. 4 illustrates an example graph 400 presenting measured voltages in an LVDT for a plurality of conditions. For simplicity of explanation, reference is made to the LVDT 200 of FIG. 2 coupled to a valve, although the principles of the graph 400 may apply to any LVDT coupled to any control element.

Measured voltages in the sensing coils 204 and 206 of the LVDT 200 are presented along the vertical axis of the graph

400, and positions of the core 208 of the LVDT 200 are presented along the horizontal axis of the graph 400. Conditions of the valve related to the positions of the core 208 ("closed" to "open") are used to label the horizontal axis. In other embodiments, other conditions of the control element being sensed by the LVDT 200 may relate to the positions of the core 208 presented along the horizontal axis.

Traces 402 and 404 for $V_A$ and $V_B$, respectively, are shown in the graph 400. As described with reference to FIG. 2, when the core 208 is at one end of its travel (the valve is in its fully closed position), the core 208 couples the excitation coil 202 more strongly to the sensing coil 206 than to the sensing coil 204. In the graph 400, this configuration is shown by $V_B$ being at a maximum value $V_{B\_max}$ and $V_A$ being at a minimum value $V_{A\_min}$. When the core 208 is at its opposite end of travel (the valve is in its fully open position), the core 208 couples the excitation coil 202 more strongly to the sensing coil 204 than to the sensing coil 206. In the graph 400, this configuration is shown by $V_B$ being at a minimum value $V_{B\_min}$ and $V_A$ being at a maximum value $V_{A\_max}$.

The graph 400 also shows a voltage 406 that represents a minimum threshold voltage to detect the core fallout condition. If either $V_A$ or $V_B$ falls below the voltage 406, a fault condition is present, and the core fallout condition cannot be detected. A fault condition, such as an open wire or other hard failure, might result in $V_A$ or $V_B$ falling below the voltage 406. The voltage 406 may be calculated from measured voltages $V_{A\_min}$ or $V_{B\_min}$. In other embodiments, the voltage 406 may be determined from a "core out" voltage ("$V_{CO}$") measured on either or both of the sensing coils 204 and 206 when the excitation coil 202 is energized while the core 208 has been removed from the LVDT 200.

Although FIGS. 2 and 3 illustrate example LVDTs 200 and 300 suitable for use with a process control system according to this disclosure, various changes may be made to FIGS. 2 and 3. For example, each coil in the LVDTs 200 and 300 could have any suitable number of turns. Although FIG. 4 illustrates one example of a graph 400 presenting measured voltages in an LVDT for a plurality of conditions, various changes may be made to FIG. 4. For example, the voltage curves need not be totally linear.

Figure 5:
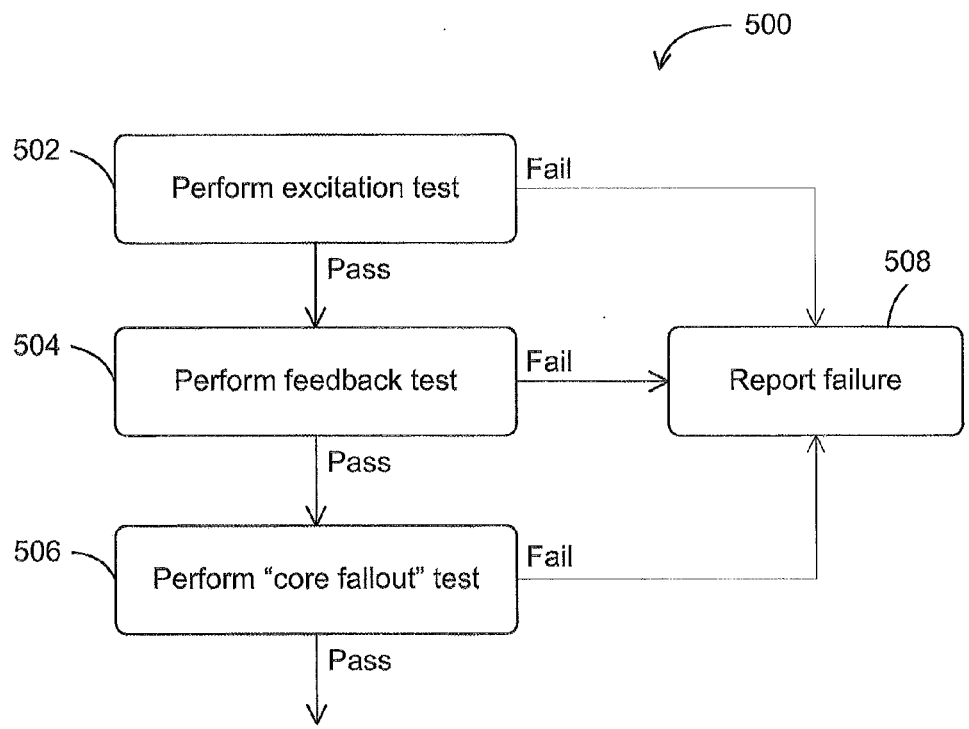
FIG. 5 illustrates an example method for testing an LVDT according to this disclosure.

FIG. 5 illustrates an example method 500 for testing an LVDT according to this disclosure. For simplicity of explanation, reference is made to the process control system 100 of FIG. 1, although the method 500 could be used with any suitable system.

In step 502, the I/O module 108 tests the excitation coil circuitry of the LVDT 104. For example, the excitation voltage may be tested by reading back the generated excitation through a hardware loop back circuit and verifying that the measured voltage lies within defined thresholds. If the excitation test fails, the process 500 continues to step 508, where the I/O module 108 reports the failure to the controller 112.

If the excitation test succeeds, in step 504 the I/O module 108 performs a feedback test to test proper functioning of the sensing coil circuitry of the LVDT 104. For example, the feedback test may be performed by reading the feedback signal from the LVDT and comparing the measured voltage with a minimum threshold. If the feedback test fails, the process 500 continues to step 508, where the I/O module 108 reports the failure to the controller 112.

If the feedback test succeeds, in step 506 the I/O module 108 performs a core fallout test. One example of a core fallout test is described in detail with reference to FIG. 6. If the core fallout test fails, the process 500 continues to step 508, where the I/O module 108 reports the failure to the controller 112. If the core fallout test succeeds, the I/O module 108 moves on to other control and processing tasks.

The I/O module 108 may perform the process 500 upon receipt of a command message from the controller 112, on a periodic basis set by configuration message from the controller 112 or by internal programming in the memory 124, or upon other suitable stimulus.

Although FIG. 5 illustrates one example of a method 500 for testing an LVDT, various changes may be made to FIG. 5. For example, additional or alternative tests of the LVDT 104 or the hardware of the I/O module 108 may be performed. Also, software testing of the I/O module 108 may be performed. In addition, while shown as a series of steps, various steps in FIG. 5 could overlap, occur in parallel, occur in a different order, or occur any number of times.

Figure 6:
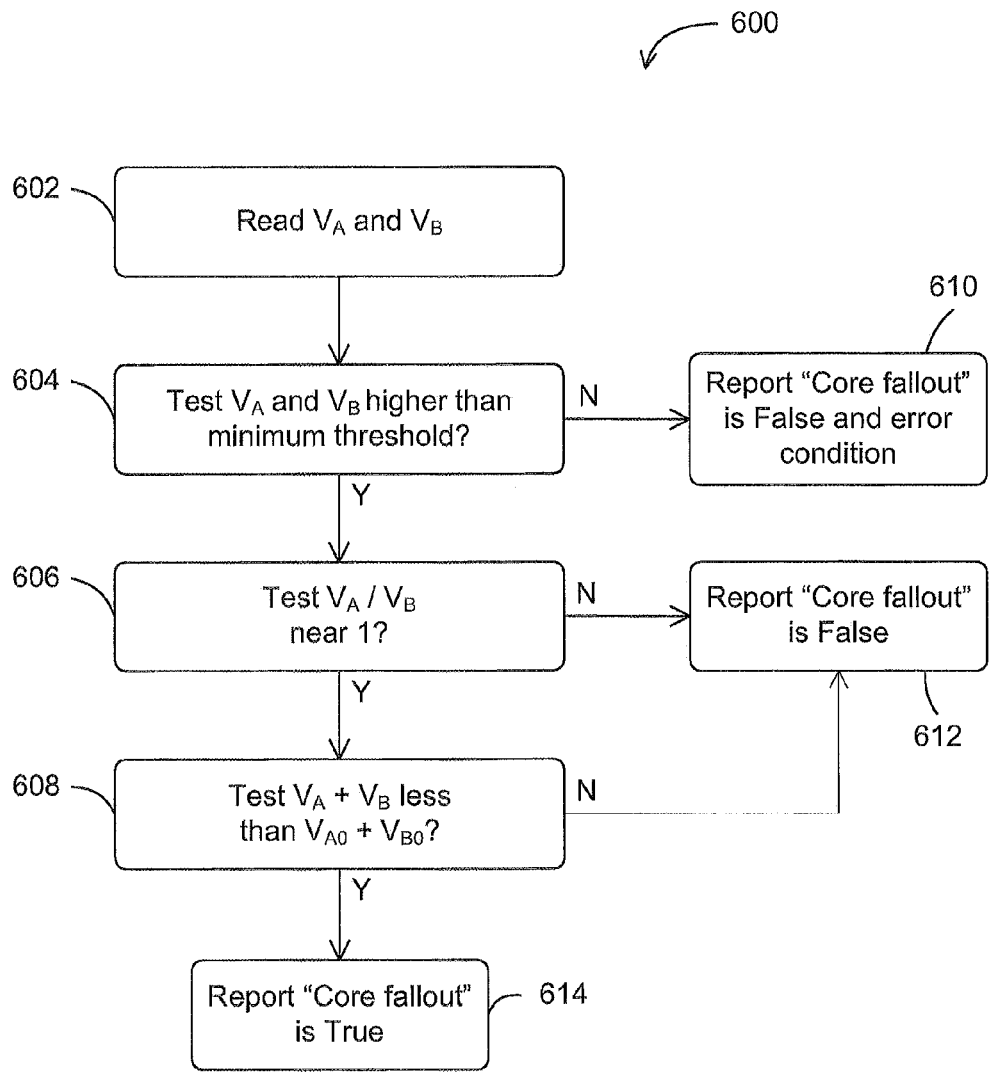
FIG. 6 illustrates an example method for detecting an LVDT core fallout condition according to this disclosure.

FIG. 6 illustrates an example method 600 for detecting an LVDT core fallout condition according to this disclosure. For simplicity of explanation, reference is made to the LVDT 200 of FIG. 2 and the graph 400 of FIG. 4, although the method 600 may apply to any LVDT and corresponding feedback voltage levels.

In step 602, voltages $V_A$ and $V_B$ are read from sensing coils 204 and 206, respectively. Raw voltage levels from the sensing coils 204 and 206 may be scaled, filtered, or otherwise processed (such as by measuring RMS values) in hardware or software before being read in step 602.

In step 604, $V_A$ and $V_B$ are each compared to a minimum threshold voltage 406. If either $V_A$ or $V_B$ is below the minimum threshold voltage 406, an error condition has been detected (such as an open wire or other hard failure), and the method 400 proceeds to step 610 to return with a "Core Fallout" flag set to false and an indication that an error condition has been detected. If both $V_A$ and $V_B$ are above the minimum threshold voltage 406, the method 600 proceeds to step 606. In other embodiments, where proper functioning of the sensing coil circuitry is determined by other testing, step 602 may not be performed.

In step 606, a ratio of $V_A$ and $V_B$ is calculated. If the ratio is not within a specified range of a value of one, the LVDT 200 passes the core fallout test, and the method 600 proceeds to step 612 to indicate the core fallout condition is not true by returning with the "Core Fallout" flag set to false. If the ratio is within the specified range of the value of one, however, the core fallout condition cannot yet be ruled out, and the method 600 proceeds to step 608. One example of the specified range is about ±10% (about 0.9 to about 1.1). In LVDTs where magnetic coupling between the excitation coil 202 and the sensing coils 204 and 206, in the absence of the core 208, is less balanced, a range greater than ±10% may be used.

In step 608, a sum of $V_A$ and $V_B$ is compared to a sum of $V_{A0}$ and $V_{B0}$. Here, $V_{A0}$ and $V_{B0}$ are minimum voltages across the first and second sensing coils of the LVDT, respectively. If $V_A+V_B$ is less than $V_{A0}+V_{B0}$ by more than a specified amount, the core fallout condition is true, and the method 600 proceeds to step 614 to identify the core fallout condition by returning with the "Core Fallout" flag set to true. If $V_A+V_B$ is not less than $V_{A0}+V_{B0}$ by more than the specified amount, the core fallout condition is not true, and the method 600 proceeds to step 612 to indicate this by returning with the "Core Fallout" flag set to false. An example value for the specified amount is about 30% of $V_{A0}+V_{B0}$. That is, if $V_A+V_B$ is less than about 70% of $V_{A0}+V_{B0}$ when tested in step 608, the core fallout condition is true.

If the method 600 is used as the "core fallout" test of step 506 of FIG. 5, returning with the "Core Fallout" flag set to true results in the "core fallout" test of step 506 failing. The method 600 returning with the "Core Fallout" flag set to false results in the "core fallout" test of step 506 passing.

Although FIG. 6 illustrates one example of a method 600 for detecting an LVDT core fallout condition, various changes may be made to FIG. 6. For example, while shown as a series of steps, various steps in FIG. 6 could overlap, occur in parallel, occur in a different order, or occur any number of times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprises:
   measuring a first voltage ($V_A$) across a first sensing coil of a linear variable differential transformer (LVDT);
   measuring a second voltage ($V_B$) across a second sensing coil of the LVDT; and
   signaling a core fallout condition in response to:
   (i) determining that a ratio of $V_A$ and $V_B$ is within a specified range of a value of one; and
   (ii) determining that a sum of $V_A$ and $V_B$ is less than a sum of $V_{A0}$ and $V_{B0}$ by more than a specified amount, where $V_{A0}$ and $V_{B0}$ are minimum voltages across the first and second sensing coils of the LVDT, respectively, when a core of the LVDT is in the LVDT.

2. The method of claim 1, further comprising:
   comparing $V_A$ and $V_B$ to a specified threshold voltage.

3. The method of claim 2, further comprising:
   signaling an error condition when at least one of $V_A$ and $V_B$ is lower than the specified threshold voltage.

4. The method of claim 2, wherein the specified threshold voltage is calculated based on at least one of $V_{A0}$ and $V_{B0}$.

5. The method of claim 1, wherein the specified range is about ±10%.

6. The method of claim 1, wherein the specified amount is about 30%.

7. The method of claim 1, wherein measuring $V_A$ and measuring $V_B$ comprise measuring root-mean-square values of $V_A$ and $V_B$.

8. An apparatus comprises:
   a circuit configured to measure a first voltage ($V_A$) across a first sensing coil of a linear variable differential transformer (LVDT) and measure a second voltage ($V_B$) across a second sensing coil of the LVDT; and
   a processing device configured to signal a core fallout condition in response to:
   (i) determining that a ratio of $V_A$ and $V_B$ is within a specified range of a value of one; and
   (ii) determining that a sum of $V_A$ and $V_B$ is less than a sum of $V_{A0}$ and $V_{B0}$ by more than a specified amount, where $V_{A0}$ and $V_{B0}$ are minimum voltages across the first and second sensing coils of the LVDT, respectively, when a core of the LVDT is in the LVDT.

9. The apparatus of claim 8, wherein the processing device is further configured to compare $V_A$ and $V_B$ to a specified threshold voltage.

10. The apparatus of claim 9, wherein the processing device is further configured to signal an error condition when at least one of $V_A$ and $V_B$ is lower than the specified threshold voltage.

11. The apparatus of claim 9, wherein the specified threshold voltage is based on at least one of $V_{A0}$ and $V_{B0}$.

12. The apparatus of claim 8, wherein the specified range is about ±10%.

13. The apparatus of claim 8, wherein the specified amount is about 30%.

14. The apparatus of claim 8, wherein the circuit is configured to measure root-mean-square values of $V_A$ and $V_B$.

15. A non-transitory computer readable medium embodying a computer program, the computer program comprising computer readable program code for:
   receiving a measurement of a first voltage ($V_A$) across a first sensing coil of a linear variable differential transformer (LVDT) and a measurement of a second voltage ($V_B$) across a second sensing coil of the LVDT; and
   signaling a core fallout condition in response to:
   (i) determining that a ratio of $V_A$ and $V_B$ is within a specified range of a value of one; and
   (ii) determining that a sum of $V_A$ and $V_B$ is less than a sum of $V_{A0}$ and $V_{B0}$ by more than a specified amount, where $V_{A0}$ and $V_{B0}$ are minimum voltages across the first and second sensing coils of the LVDT, respectively, when a core of the LVDT is in the LVDT.

16. The non-transitory computer readable medium of claim 15, wherein the computer program further comprises computer readable program code for comparing $V_A$ and $V_B$ to a specified threshold voltage.

17. The non-transitory computer readable medium of claim 16, wherein the computer program further comprises computer readable program code for signaling an error condition when at least one of $V_A$ and $V_B$ is lower than the specified threshold voltage.

18. The non-transitory computer readable medium of claim 16, wherein the specified threshold voltage is based on at least one of $V_{A0}$ and $V_{B0}$.

19. The non-transitory computer readable medium of claim 15, wherein the specified range is about ±10%.

20. The non-transitory computer readable medium of claim 15, wherein the specified amount is about 30%.

* * * * *